US005585426A

United States Patent [19]

Williams et al.

[11] Patent Number: 5,585,426

[45] Date of Patent: Dec. 17, 1996

[54] PROCESS FOR IMPARTING AN ELECTROSTATIC CHARGE TO POWDERS TO RENDER THEM USEFUL FOR COATING APPLICATION

[75] Inventors: Barbara E. Williams, Greenwich, Conn.; Ian Harpur; Graham Hearn, both of Southampton, England

[73] Assignee: Nexus Corporation, Greenwich, Conn.

[21] Appl. No.: 320,892

[22] Filed: Oct. 5, 1994

[51] Int. Cl.[6] ........ C08L 63/00

[52] U.S. Cl. ........ 524/366; 524/377; 524/378; 524/904; 427/475; 427/485

[58] Field of Search ........ 427/458, 469, 427/474, 485, 486, 475; 524/904, 366, 377, 378; 525/934; 430/110; 204/165

[56] References Cited

U.S. PATENT DOCUMENTS

| | | | |
|---|---|---|---|
| 4,013,615 | 3/1977 | Ohashi et al. | 260/42.53 |
| 4,443,527 | 4/1984 | Heikens et al. | 430/39 |

FOREIGN PATENT DOCUMENTS

| | | | |
|---|---|---|---|
| 54-43736 | 4/1979 | Japan | 430/110 |
| 55-111950 | 8/1980 | Japan | 430/110 |
| 56-88470 | 7/1981 | Japan | 524/904 |

OTHER PUBLICATIONS

"Electrographic toner and developer composition", Research Disclosure, Oct. 1972, pp. 57–58.

*Primary Examiner*—Shrive Beck
*Assistant Examiner*—Fred J. Parker
*Attorney, Agent, or Firm*—Lieberman & Nowak, LLP

[57] ABSTRACT

A process for improving the electrostatic charge developed on a resin powder composition for electrostatic coating of solid objects and the method of application thereof. The resin powder comprises (i) a thermosetting or thermoplastic resin and (ii) an electrostatic property modifying agent (polyalkylene ether, polyalkylene glycol, polyethoxylated stearyl alcohol) incorporated in the resin or on the surface of the resin. The methods of application of the powder involves charging the powder by electrical induction/conduction and spraying the charged powder onto a grounded solid object to which it adheres prior to the thermal fusing to produce a permanent finish.

3 Claims, 4 Drawing Sheets

PROCESS FOR IMPARTING AN ELECTROSTATIC CHARGE TO POWDERS TO RENDER THEM USEFUL FOR COATING APPLICATION

BACKGROUND OF THE INVENTION

1) Field of the Invention

The present invention relates to a process for improving the electrostatic charge developed on resinous powders for powder coating applications. In one aspect the invention relates to a process for coating substrates using the resinous powders having the improved electrostatic charge. In another aspect the invention relates to a powder induction/conduction charging system for coating substrates.

2) Background Art

In recent years, much progress has taken place in the field of electrostatic powder coating. Powder coating, as a separate technology, developed as a result of a number of clear advantages over other methods of coating such as brushing, dipping and conventional spraying. These include the inherent advantages due to the absence of solvent (safer, less harmful to the environment, less expensive, cleaner working environment) as well as decreasing the time taken for the coating process to produce an article ready for use. Control of the coating thickness and the ability to produce a high quality finish from a single application treatment are also possible with this method.

Much of the early work in the field resulted in methods being developed which are capable of reaping many of these advantages. However, there are still a number of drawbacks within the technology which need to be overcome.

Powder coating technology is based on the principle of electrostatic charging and presently available practical methods of charging are classified into a corona charging system, a triboelectric charging system or a hybrid system. Each system has evolved from the earliest corona charging system which is little more than a hollow barrel through which powder is pneumatically conveyed, with charging of the powder being accomplished by ionic attachment at the barrel, or gun exit.

A brief review of each of the current systems and the reason for the development of the more recent tribo and hybrid systems is given here to serve as a background to the present invention.

The basic corona charging system involves charging by ionic bombardment using an ion source such as a high voltage corona electrode or radioactive element. This method is used quite often to apply charge to highly insulating materials such as plastics. It can be very inefficient when applying electrostatic charge to powders since many of the ions produced do not contribute to the charging of particles but alight elsewhere, for example, on the workpiece itself in a powder coating operation. In some of the worst cases, charging efficiencies of less than 1% had been quoted in corona powder coating equipment.

In the corona charging system, powder is conveyed from a hopper through feed hoses to a spray gun. A sharp pointed electrode in the gun is connected to a high voltage generator and the combination of electrode geometry and high voltage (up to 100 kV in some guns) creates an electric field in excess of the local breakdown strength of the surrounding gas, which is usually air. A corona discharge is generated and free ions are formed in front of the charging electrode.

Powder particles are conveyed through this space charge region and are charged by ionic attachment. The particles follow the air-flow pattern and those that are sufficiently charged are deposited onto the workpiece, which is generally held at ground potential. The polarity of the charging electrode can be reversed to create either a positive or negative charge on the particle, with a negative charge being generally preferred due to the larger numbers of ions being produced.

The charging efficiency of this system is very poor since only a small fraction (~0.5%) of the ions produced by the corona contributes to the charge on the powder. The majority of the ions produced by the corona gun do not attach to the sprayed powder particles but travel as 'free ions' to the workpiece where they accumulate rapidly within the deposited powder layer.

As more free ions reach the workpiece, the intensity of the charge within the powder layer reaches saturation. At this point small electrostatic discharges (back-ionization) can occur resulting in disruptions in the coating and, ultimately, a poor quality finish.

The onset of back-ionization essentially limits the useful coating thickness that can be applied using corona charging powder coating equipment.

Besides requiring a high voltage power supply, a further disadvantage of corona guns is that they are not suited for applications requiring penetration into cavities and corners. This is due to all the voltage which appears at the external high voltage electrode being dropped between the gun head and the grounded workpiece with subsequent little, or no, penetration of the field associated with this voltage into cavities and recesses. These areas then approximate enclosed Faraday cages. Under these conditions internal coating will only be achieved by pneumatically conveying the particles into such areas, which can be difficult to achieve while simultaneously ensuring good coating uniformity elsewhere.

Perhaps the most common alternative system to corona charging is triboelectrification or frictional charging which takes place when two unlike materials or surfaces which are previously uncharged, that is in a electrically neutal state, make contact and then separate. During this process electrostatic charge is also separated with one of the surfaces attaining a positive polarity charge and the other a negative charge. This process occurs commonly in everday life. Examples are powder being conveyed through a pipe and a person walking across a carpeted room. In the latter case, there is friction between the soles of the shoes and the carpet.

The magnitude and even the polarity of electrostatic charge generated in this way are heavily dependent on factors such as surface contamination, moisture content and the nature of the contact. Although this method of charge generation is used in electrostatic powder coating, it has encountered reliability problems.

While a standard corona gun applies a charge of approximately $1\times10^{-3}$ C/kg to powder particles, frictional charging transfers a few hundreds of electronic charge per contact and, therefore, to obtain charges equal to a corona gun thousands of contacts are required. The simplest method by which this is achieved is a straight tube in which there is turbulent flow, resulting in a large number of powder/wall collisions. Wall surfaces are ideally insulators arranged with grounding points so the high charge built up on the surface can decay to ground. PTFE, poly(tetrafluroethylene), is usually used in commercial systems and its place in the tribo-electric series ensures that most powders charge to a positive polarity on contact with it.

With tribo-electric guns the free ion current is eliminated or considerably reduced and, as there is no applied electric field, the particles are directed onto the workpiece by a combination of the air flow and the field produced by the charged powder cloud. Due to these factors, back ionization does not occur for 10 to 20 seconds in tribo-electric systems and it is easier to obtain heavy or thick films with this system. A further advantage is the ability of the system to coat inside cavities, small complex parts and products with sharp corners, etc. Furthermore, frictional charging not only overcomes the Faraday cage effect and reduces back ionization, but facilitates gun design to accommodate spray heads that accept different types of nozzles.

The fundamental disadvantage with a tribo gun is that a decrease in efficient charge exchange occurs after a prolonged period of operation. A still further disadvantage is that the particle size distribution of the powder has a significant effect on tribo charging and its efficiency. A typical powder for coating contains a combination of small, medium and large particles, ranging from sub-micron size up to greater than 80 microns in diameter. It is known that within such systems hi-polar charging of the powder can occur, with smaller particles more likely to charge to a negative polarity. The efficiency of charging is a function of the diameter of the particle and as a result the smallest particles are not electrostatically attracted to the workpiece resulting in preferential deposition of the mid-size range particles. Thus transfer efficiency is reduced and so too the overall operational efficiency of the system due to the increasing build-up of deposits in the guns and powder collecting and recycling equipment. Fluidizing problems in the feed hopper can also occur.

Finally, there are the so called "hybrid" guns which contain both of the aforementioned methods i.e., corona charging and triboelectrification in one gun, in an attempt to combine the advantages of both systems. However, this approach does not remove the main inherent disadvantages of both guns—poor powder charging and transfer efficiency.

The coating efficiency is about 70–75% at best using presently available materials for practical industrial purposes. Any non-deposited powder will be wasted or must be recovered by use of special recovery equipment and reused by adding it in small portions to virgin powder or by recycling it to the resin preparation step. Manufacturers of powder coatings claim that it is possible to achieve 97–98% usage of powders, citing this as an incentive for switching from wet spray systems where any overspray is wasted. A flaw in this argument is that to achieve such high usage dedicated recycle equipment must be operated on an exclusive basis on each line, whereby it is not easy to change the type or hue of the coating material. Thus, the installation cost of the recovery apparatus and the awkward scheduling of its operation and the time required for the recovery add to the total cost.

Accordingly, one or more of the following objects can be achieved by the practice of the present invention. It is an object of the present invention to provide a method of electrostatically charging a powder for use in powder coating applications which is free from the aforementioned shortcomings. A further object of the invention is provide a method for charging powders which allows an electrostatic charge to be developed on the powder in a reliable and repeatable manner. Another object is to provide a method which can accurately and reliably control the quantity and polarity of electrostatic charge developed and thus insure the coating of all areas of a workpiece to any required thickness. Another object of the invention is to provide a process for applying a charge to thermoplastic and thermosetting resins which are used in powder coating operations. Another object is to improve the electrostatic charge on powders by incorporating an electrostatic property modifying agent in, or on, the surface of the resin. A still further object is to provide a process for applying electrostatically charged powders as a coating on solid objects. A still further object is to provide powders for coating solid objects by inductive means. Another object is to provide a process for coating solid objects with a powdered resin which can be subsequently fused to provide a uniform and continuous coating on such objects. Another object of the present invention is to provide a process for the application of powder coating to solid objects which is efficient and minimizes powder waste.

A further object of the invention is to provide a system useful for spraying the electrostatically charged powders onto solid objects which can then be fused to provide a permanent finish. Another object is to provide a novel system for spraying electrostatically charged powders onto heated solid objects whereby fusing of the powder into a permanent finish is achieved. These and other objects will readily be achieved in light of the teachings herein set forth.

BRIEF DESCRIPTION OF THE DRAWINGS

FIG. 3(*b*) is a schematic diagram depicting an electrical field applied between the plates of FIG. 3(*a*) by raising the upper plate to a high voltage wherein induced charge flows onto the surface of the object.

SUMMARY OF THE INVENTION

Figure 1:
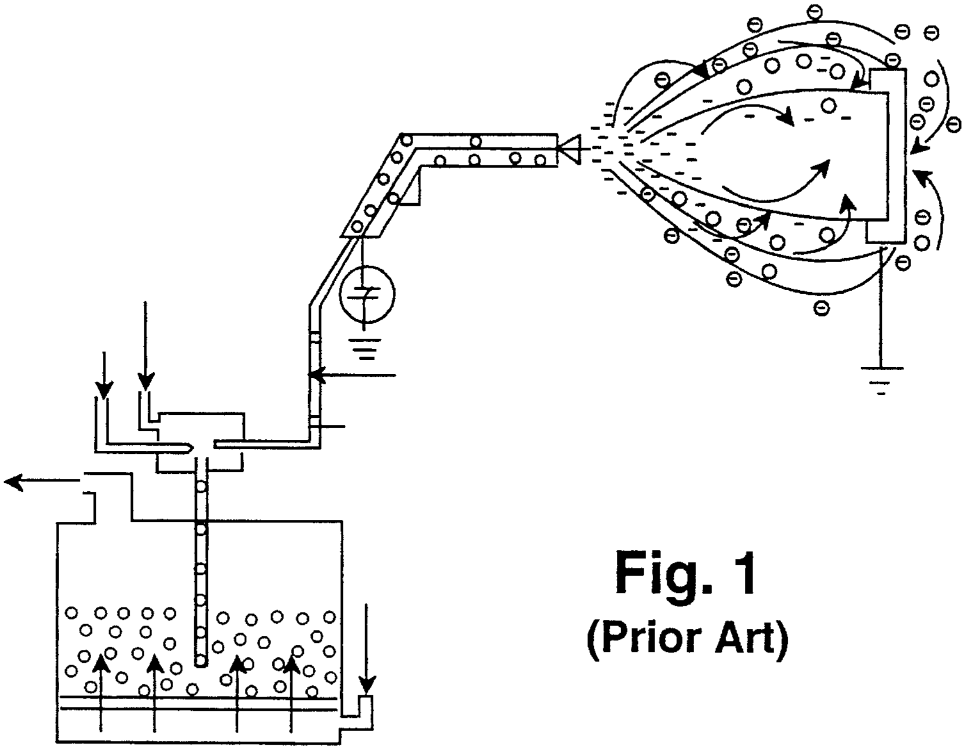
Fig. 1 (Prior Art)
FIG. 1 is a schematic diagram depicting the basic corona charging principle.

In its broad aspect, the present invention is directed to a process for improving the electrostatic charge on resinous powders for powder coating applications. The invention is also directed to a powder inductive charging system for coating objects and a process using the system for coating objects.

In one aspect the invention relates to a process for improving the charge on resinous powders. The process imparts an electrostatic charge to organic powders to render them useful for powder coating applications, and involves forming a blend of the powders and at least one electrostatically active modifying agent, and subjecting the blend to electrically inductive/conductive conditions sufficient to impart to the powders a resistivity of from about $10^9$ to about $10^{13}$ ohm.meters at 20 percent relative humidity.

Realizing that the drawbacks as previously enumerated are due to the electrostatics of the present systems, the current inventors have conducted extensive and exhausting research into developing a method which relies on a completely new approach to the charging of the powder used in electrostatic powder coating. As a result it has been found possible to overcome the above drawbacks inherent to the powder coating process as currently practiced by developing a method of charging the powder by influence, having firstly modified the powder by adding an electrostatically active agent to the resin powder. The present invention has been accomplished on the basis of this discovery.

The present invention provides a method for electrostatically charging a resinous powder by influence, known either as induction or conduction charging.

The resinous powder composition comprises (i) a thermosetting or thermoplastic resin and (ii) an electrostatically active modifying agent incorporated in, or on, the resin. The modifying agent employed is one which does not alter the melt or durability characteristics of the resin powder. The modifying agent is also useful in promoting the ease with which the charge is imparted and retained regardless of the size of the powder particle.

Accordingly, the present invention provides a method of electrostatically charging a powder for use in powder coating, free from the above-mentioned conventional shortcomings which allows an electrostatic charge to be efficiently and uniformly developed on the powder in a reliable and repeatable manner and which, furthermore, can accurately and reliably control the quantity and polarity of electrostatic charge developed (thus the ability to coat all areas of a workpiece evenly to any required thickness).

The invention also provides a process for producing a powder intended for surface-coating solid objects (workpieces) for use with the above-mentioned method of electrostatic charging.

The objectives of the present invention can be achieved by placing the modified powder in an area where an electric field is present, in such a manner as to allow electric charge to flow onto the powder particles which, by modification with an electrostatically active agent, are sufficiently conducting to facilitate electrical conduction. This property of the powder is characterized by its resistivity (surface or bulk) and generally speaking the lower the resistivity of the powder the easier it is to place an electrostatic charge on it by induction. Once charged, the powder is then pneumatically transported to the workpiece. The charge on the powder will decay once deposited with the rate of decay increasing with decreasing resistivity. It is very important that the powder remains attached to the workpiece long enough for the workpiece to be transported to the curing oven. If the charge decays too quickly, this can not be guaranteed. Thus, there are two requirements: low resistivity for efficient charging and a high resistivity for longevity of adhesion to the workpiece.

To meet these contradictory requirements a number of different countermeasures are proposed. The first involves a compromise resistivity approach whereby the resistivity of the powder is modified to a value of between about $10^9$–$10^{13}$ ohm.meters, and preferably between about $10^{10}$–$10^{12}$ ohm-.meter. At these values, charging to approximately 63% of a limiting value (which is a function of particle size, shape and material as well as the strength of electric field to which it is exposed) is achieved in approximately 0.2 to 2 seconds.

Once on the grounded workpiece, charge decay to 37% of the value to which it had been charged occurs in the same time frame but the period over which the image force of attraction operates is sufficiently long to allow the establishment of the adhesion forces, between the particles and the substrate and between the particles themselves, to develop. These forces are sufficient to hold the powder on the workpiece long enough for it to be transported for permanent fusing in an oven. Curing times are usually about 275°–450° F. for about 5–10 minutes.

It should be noted that powder particles with resistivities below the lower limit set forth above, are not retained on the workpiece or substrate long enough to establish adhesion, while at a resistivity above the upper limit the process is difficult to control.

A second method involves spraying the charged powder onto a grounded, heated workpiece. The temperature of the workpiece is such as to ensure partial melting of the powder particles as they alight on it, thus the adhesion to the workpiece is due to the wetting of the piece by the melted powder and not to electrostatic forces.

A third method involves a slightly different, but no less important, application of electrostatic powder spraying: the finishing of electrically insulating materials such as plastics or ceramics. In this case, powder charging and spraying is similar to that in the conventional finishing of conducting, grounded workpieces but the electrostatic assist to ensure deposition and even coating is achieved in a different manner.

As the workpiece is insulating, no image charge is induced in it as the charged powder cloud approaches so the powder will not be attracted to the workpiece unless it itself is precharged to the opposite polarity of the charge on the powder. This can be achieved by corona charging of the workpiece, thus setting up a deposition field between the powder cloud and the workpiece. Coating will continue until there is no net charge on the workpiece and adhesion is assured because no charge relaxation can occur from the insulating workpiece. Other methods are possible, some dependent on the geometry of the insulating workpiece, e.g. in the case where it is a thin sheet or film, coating of one side can be made possible by placing a conducting substrate on the opposite side and placing a voltage on it, opposite in polarity to the charge on the powder.

A fourth method involves a key discovery made during the intensive research leading to this invention. The ideal solution to the dichotomous requirements of low resistivity for efficient charging and high resistivity for adequate adhesion can best be met by designing a powder which has a resistivity which is, in the broadest sense, situation dependent, this is to say, a resistivity which is a function of the prevailing conditions at the charging station and at the workpiece. By controlling the conditions at both areas, having first designed the powder to be extremely sensitive to changes in the environment in which it finds itself, it has been found possible to ensure low resistivity at the charging station and high resistivity at the workpiece.

By examining the activity of various electrostatic property modifying agents (hereinafter referred to as modifying agents) as a function of temperature, moisture content and electric field strength we have identified a family of modifying agents which, when added to currently available powders for powder spraying, modifies the composite powders resistivity and makes it dependent on the above mentioned variables of temperature, moisture content and electric field strength.

DESCRIPTION OF THE PREFERRED EMBODIMENTS

As hereinbefore indicated, the resin powder composition for electrostatic coating of the present invention comprises a thermosetting or thermoplastic resin and from 0.01% to 20% by weight of an electrostatic property modifying agent. This composition may further contain a curing agent, a pigment, a metal powder filler, a flow controlling agent, a plasticizer or a stabilizer. In the present invention, the thermosetting resin may be a conventional type such as an epoxy resin, a polyester resin or an acrylic resin. Likewise, thermoplastic resin may be a vinyl chloride resin, a polyamide resin, a cellulose resin, a polyolefin resin, a polyethylene resin, a polyester resin or a nylon resin. The resin may be used alone or in combination as a mixture.

The electrostatic property modifying agent as the essential component of the present invention may be a polyalkylene ether, a polyethylene glycol, a polyethoxylated stearyl alcohol, a quaternary ammonium salt or a halogenated ammonium salt. These compounds may be used alone or in combination as a mixture of two or more.

The quaternary ammonium salt includes, for example, 3-lauramidopropyl trimethylammonium methyl sulphate (CYOSTAT LC, trademark for a quaternary ammonium salt, manufactured by Cyanamid Company) and (CYOSTAT SN, CYASTST SP, CYASTST 609, trademarks for quarternary ammonium salts manufactured by by the same Company) and (ATMER a trademark for an anti-static range from ICI,).

The resin powder composition of the present invention may be readily prepared in accordance with a conventional method. For example, the binder resin and the modifying agent may be heated, melted and kneaded by means of a conventional mixing machine such as a single screw or multi-screw extruder, a Banbury mixer or heat rolls, then cooled and pulverised to obtain a powder. Any method commonly employed for the preparation of a powder mixture, such as any method for mixing a binder resin powder and a powder of an electrostatic property modifying agent. In some cases it may be necessary to form a film on the surface on the binder resin of the electrostatic property modifying agent by application of mechanical energy to the mixture. In this case, the ratio of particle diameters (volume mean) needs to be greater than 10:1, the binder resin being the larger.

The particle size of the resin powder for coating according to the present invention is preferably within a range of from about 10 to about 250 microns.

The resin powder coating composition of the present invention may further contain in addition to the above components, a hardener, a pigment, a metal powder, a filler, a flow controlling agent, a plasticizer, a stabilizer and other additives, as the case requires.

The resin coating powder of the present invention may be applied to substrates made of metals, ceramics, plastics, etc. by a powder coating apparatus which is also disclosed. Various primers may be applied to such substrates, or various other pretreatments may be applied to such substrates. The preferred embodiments of the powder coating apparatus of the present invention will now be described, but the invention is not limited to the described configuration.

Figure 2:
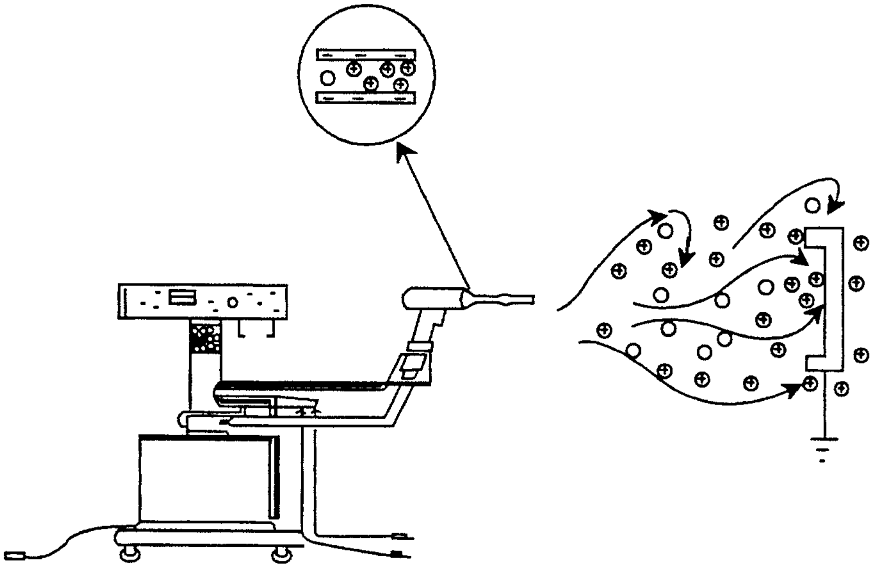
Fig. 2 (Prior Art)
FIG. 2 is a schematic diagram depicting basic tribo charging.

The invention will be more readily understood by reference to the drawings wherein FIGS. 1 and 2 depict prior art processes for powder coating applications. FIG. 1 is a schematic diagram showing the basic corona charging principle while FIG. 2 depicts the principle of tribo charging.

Figure 3A:
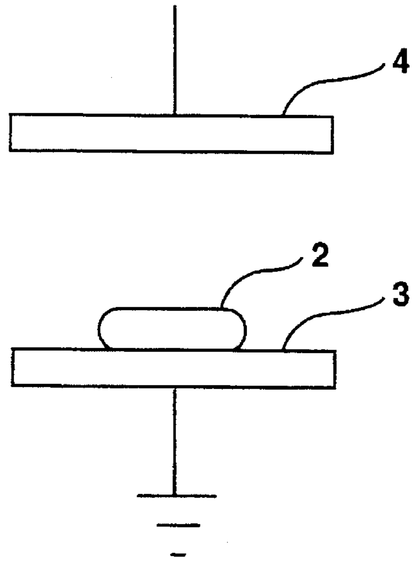
FIG. 3(*a*) is a schematic diagram representing an object resting on a plate between a neutral electrical field.
Figure 3B:
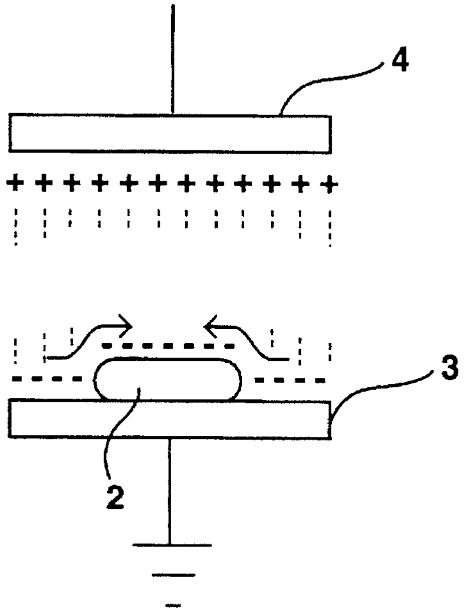

Induction/conduction charging relies essentially on the flow of electrostatic charge over the surface of the object or material to be charged. For this reason, the object or material to be charged cannot be highly electrically insulating. FIG. 3(*a*) illustrates this effect by showing a large particle between two parallel electrodes. In the figure there is no power applied to the electrodes and therefore no charge on the particle. In FIG. 3(*b*) a potential is applied to the electrodes and electrostatic charge flows from the lower electrode across the surface of the particle and the particle becomes charged. If the particle was removed from the lower electrode and removed from the system, the charge would be retained by it. It is now charged by induction.

The same situation would occur if the polarity of the electrodes was reversed with the lower made to be the high voltage electrode and the upper grounded. In this case, the particle would be charged to a positive polarity.

If the particle was constructed not from an electrically conductive or partially conductive material but from from a insulator such as Teflon, the electrostatic charge from the lower plate would not be able to flow across the particle surface and therefore it would not acquire a charge.

It should be noted that the term "induction" can be applied to cases where the object becoming charged is either in contact with the ground electrode or the high voltage electrode. For greater precision, "induction" is used where the object is in contact with ground and "conduction" where the object is in contact with the high voltage source. The situation is symmetrical and so is the magnitude of the charge attained.

The important parameters with induction/conduction charging are the charging and discharging rates. These are governed by the electrical conductivity of the material. The more resistive a material is, the more time it requires to achieve maximum charge levels. For example, a metal which is highly conductive will acquire charge by induction within a fraction of a microsecond. A doped polymer may require several seconds.

An approximate guide to the rate at which a material will acquire or dissipate charge by induction/conduction is given by the following formula:

$$t=e_o e_r p$$

where p is resistivity of the material in ohm.meters, $e_o$ is the permittivity of free space ($8.85\times10^{-12}$), $e_r$ is the dielectric constant and t is the time of taken for the charge to reach 63% of its maximum when charging (or 37% of its maximum when discharging).

Both high voltage power supplies and powder feed systems are established technology. The induction/conduction charging of the powder will be achieved at the charge transfer platform, which is one of the key areas of the invention. The exact design will be varied according to use. To illustrate, the platform for coating a large and heavy piece conveyed by a track would in no way resemble the platform for fuse boxes suspended from an overhead conveyor. The charge platform can be incorporated either in the gun head or upstream of the gun such that the powder is charged in advance of ejection rather that at the point of ejection. In addition it is possible to incorporate two charging stages, the first stream of the gun such that precharged powder arrives at the ejection point; the second use of a high voltage electrode at the gun nozzle essentially "topping up" the charge on the powder at this point and using the electric field established between the high nozzle and the grounded workpiece to assist in transfer and deposition of the powder.

FIG. 3(*a*) is a schematic diagram representing an object (2) resting on a plate (3) between a neutral electrical field. FIG. 3(*b*) is a schematic diagram depicting an electrical field applied between the plates of FIG. 3(*a*) by raising the upper plate (4) to a high voltage wherein induced charge flows onto the surface of the object.

Figure 4:
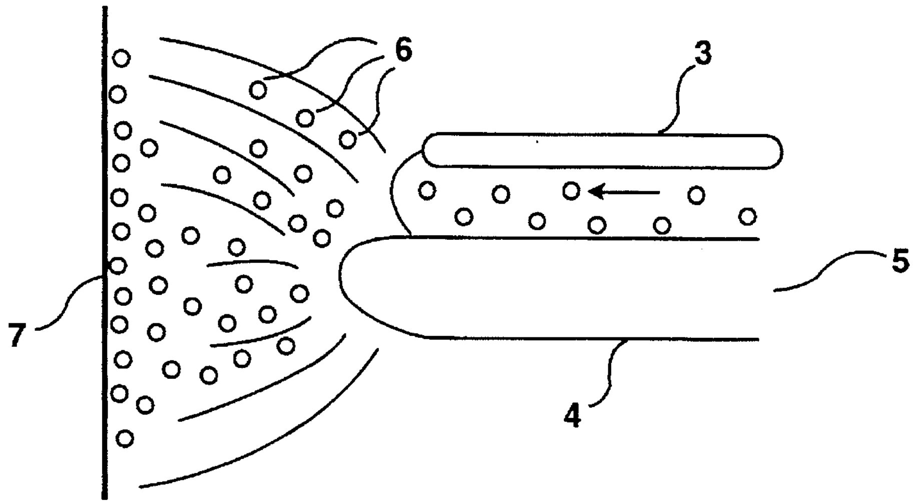
FIG. 4 is a schematic diagram of an induction charging gun showing the nozzle.

FIG. 4 illustrates an alternative induction coating system. The powder is pneumatically transferred to a region of high electric field at the gun head (5) where it acquires charge by induction. The charged powder (6) is transferred to the workpiece (7) by a combination of electric field and air flow. The introduction of a counter electrode may intensify the field at this point and improve charging of increased intensity is required. The effect and the necessity of such an electrode can be determined through analysis of the field geometry.

Figure 5:
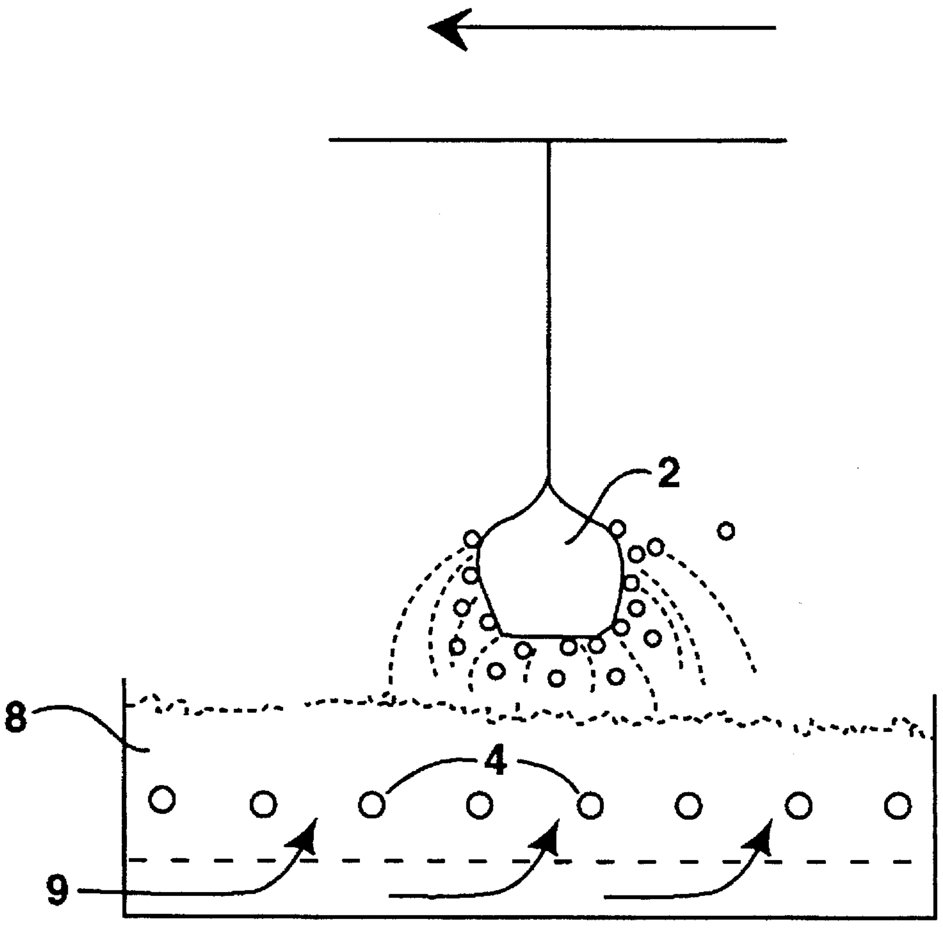
FIG. 5 is a schematic diagram depicting an induction charged fluidized bed coater.

FIG. 5 illustrates an alternative method of coating items using an induction/conduction charging technique. In this case the object (2) to be coated is suspended above a fluidized bed (8). The powder in the bed is charged by contact with high voltage electrodes (4) buried in the powder bulk. the powder coating is transferred to the workpiece by a combination of fluidized air (9) and the electrostatic attraction forces.

Figure 6:
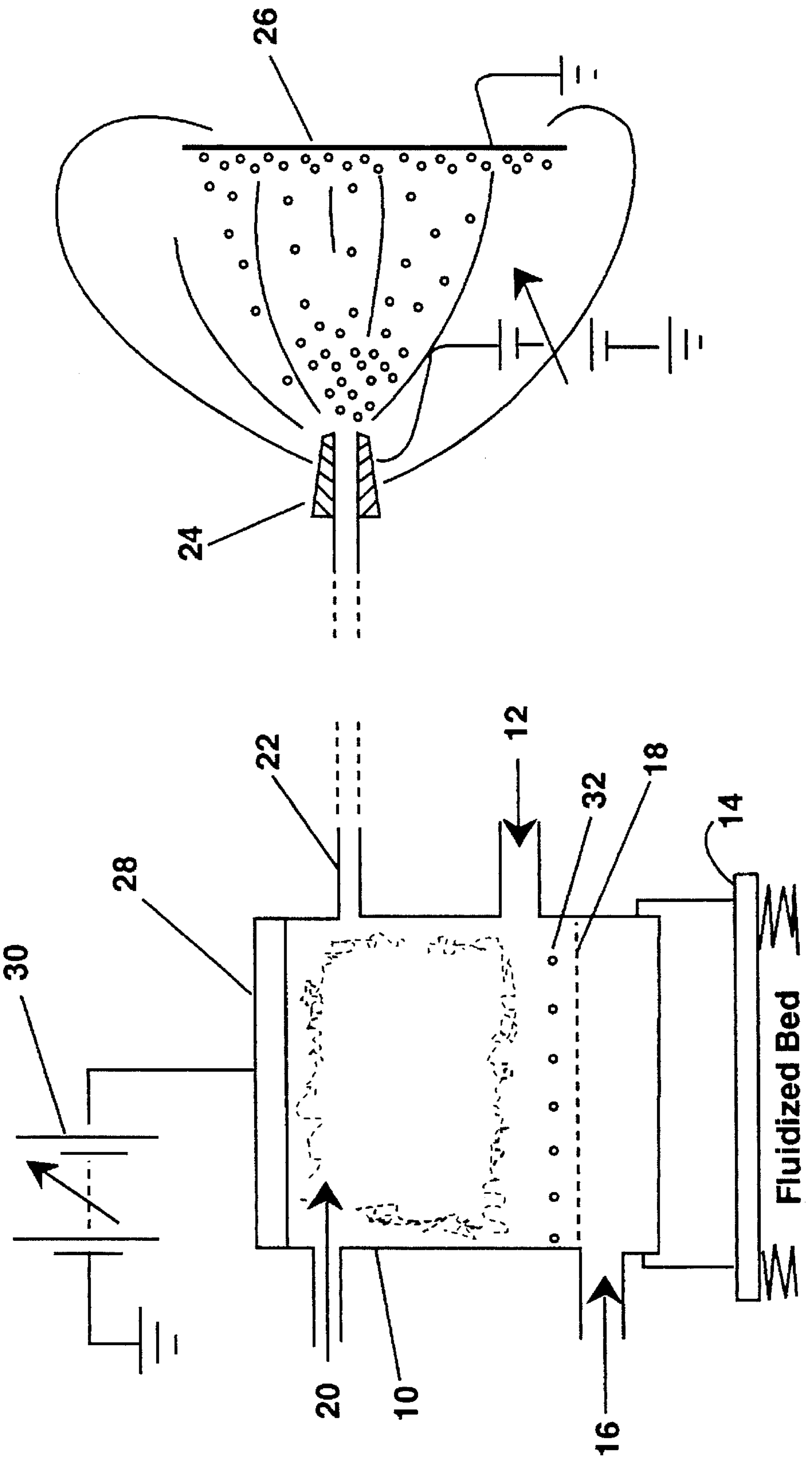
FIG. 6 is a schematic diagram depicting the inductive/conductive principle employed in the present invention.

FIG. 6 is one representation of the basic design for a powder induction charging system. It shows a fluidized bed type electrostatic charger and powder applicator. Powder is fed continuously to an electrically insulated bed or zone (10) from powder reservoir (not shown) through port (12). The whole bed can sit on a vibrating table (14) which helps loosen the powder in the bed. Fluidizing air (16) is fed to beneath the air distributor plate (18) and transport air enters the bed near the top in a radial direction from (20) positioned directly opposite exit port (22) to nozzle (24) which directs the powder to the substrate (26). An electric field is set up across the bed, the electrodes being a high voltage electrode (28) supplied by an extra high tension source (30). The lower electrode is formed by the upper layers of the fluidized powder, in contact with a sintered grounded grid (32). Charge is induced on the powder as it enters the bed and once carried upwards and out of the bed by the fluidizing and transport air, this charge is locked on the powder until it reaches the workpiece. An electric field created between the high voltage nozzle of the applicator and the grounded workpiece assists in the transport and deposition of the charged powder.

The invention will be further explained by consideration of the following examples:

EXAMPLE 1

Powder Modification Step

Evlast 1000/1W104, a commercially supplied white polyester resin powder manufactured by EVTECH Co. of North Carolina, U.S.A., was used in this test example.

The resistivity of the powder at 20% relative humidity was determined to be $1.5\times10^{15}$ ohm.meters. The resistivity was measured using a powder resistivity measurement cell developed by Wolfson Electrostatics, University of Southampton, UK.

One kilogram of this powder was mixed with 2% by weight of Cyostat LS agent. The mixture was melted, extruded, cooled and ground to a fine powder. The resulting powder was further sieved and the portion passing 150 pm used in this test example.

The resistivity of the test powder at 20% relative humidity was determined to be $1\times10^{11}$ ohm.meters. The volume average diameter of the test powder was determined to be 40 microns.

A feed of 4 $g.min^{-1}$ of the test powder was supplied to an apparatus similar to that shown in FIG. 6. Once a sufficient reservoir of powder was present in the bed, the fluidizing air and transport air supplies were opened and adjusted so that steady state conditions were reached, that is, exactly as much powder left the bed through the nozzle as entered in the feed. Once these conditions had been reached, a voltage of 20 kV was applied to the upper electrode. The gap between the upper-electrode and the grounded plate was 10 cm, thus a minimum electric field of 2 kV $cm^{-1}$ was set up across the bed.

A conductive target plate (test workpiece) of approximately 100 $cm^2$ was placed 30 cm directly in front of the nozzle. the target plate was grounded via an electrometer which was capable of measuring the amount of charge flowing to the plate.

Powder was collected on the plate for 20 seconds, beginning 5 seconds after the voltage was applied. In this time 1.1 g of powder was collected on the plate, to which $9.4\times10^{-8}$ Couloms of charge had flown. This indicates that a charge of almost $1\times10^{-4}$ Coulombs per kilogram has been applied to the powder by induction charging. Such specific charge levels are sufficient for good powder adhesion. All of the powders adhered to the plate for at least 2 minutes after the spraying had ceased.

EXAMPLE 2

Scotchkote 213, a commercially supplied fusion bonded epoxy resin powder manufactured by the 3M of Minnesota, U.S.A. was used in this test sample.

One kilogram of this powder was dry mixed with 20 g of antistat. The powders were blended together in a Waring blender until an ordered mixture was obtained. Before and after modification, the resistivity of the binder resin and composite powder was determined to be $3\times10^{14}$ ohm.meters and $1.2\times10^{9}$ ohm. meters respectively at 20% relative humidity. The volume average diameter of the test powder measured at 25 um.

A feed of 3 $g.min^{-1}$ of the test powder was supplied to the apparatus in a similar manner to Example 1. Again, an attainment of steady state conditions, a voltage of 20 kV was applied to the upper electrode. This time the target plate was heated to a surface temperature of 115° C. and powder was sprayed onto the plate for 30 seconds. During this time 1.35 g of powder was transferred to the plate and a charge of $5.5\times10^{-7}$ Coulombs flowed to the plate. All of the powder adhered to the plate with the layer in contact with it fusing.

In addition to replacing conventional powder coating systems, the present invention finds applications in other industrial coating areas. Provided that the material to be applied can be charged by induction/conduction and that the flow characteristics of the material are suitable, the use of induction/conduction as a method of charging has advantages in number of industrial applications.

For example, there is a great interest in applying good quality coatings to electrically insulating materials. One such instance, is the application of decorative coating to glass, such as bottles. There is in fact an inherent problem in achieving this with conventional electrostatic systems since the corona discharge on standard coating equipment produces a high proportion of free-ions which charge the surface to be coated to the same polarity as tha applied material. Since the surface to be coated is electrically insulating, the charge cannot escape and quickly repels the on-coming particles resulting in poor transfer efficiency and poor quality coatings. In the case of an induction/conduction charged powder, the free-ions are not produced and therefore this problem does not arise.

There are also a number of other specific industries where the use of induction/conduction charging of powder prior to application to an object or surface may be advantageous. Application of good quality coating to insulators, anti-corrosion lining of pipes and containers, internal coating of light bulbs, frosting of glass and decorative coatings on wooden or plastic furniture, can be achieved by the practice of this invention.

It is also known that popular flavorings such as chili or cheese and onion on packet snacks are currently applied in powder form in a relatively crude manner which is both inefficient and wasteful. Many foodstuffs fall into a resistivity of $10^6$–$10^{13}$ ohm.meters which makes them ideal candidates for electrostatic induction charging. Also, the snacks onto which the powdered flavorings are applied are often themselves imperfect electrical conductors and this reinforces the advantages of induction charging due to the absence of free ions.

Although the invention has been illustrated by the preceding examples, it is not to be construed as being limited to the materials employed therein, but rather, the invention relates to the generic area as hereinbefore disclosed. Various modifications and embodiments thereof can be made without departing from the spirit or scope thereof.

What is claimed is:

1. A process for imparting an electrostatic charge to organic powders to render them useful for powder coating applications, which comprises forming a blend of said powders and a polyalkylene ether as an electrostatically active modifying agent to improve the charge on said powders, and subjecting said blend to electrically inductive or conductive conditions, wherein said powders have a resistivity of from about $10^9$ to about $10^{13}$ ohm. meters at about 20 percent relative humidity.

2. A process for imparting an electrostatic charge to organic powders to render them useful for powder coating applications, which comprises forming a blend of said powders and a polyalkylene glycol as an electrostatically active modifying agent to improve the charge on said powders, and subjecting said blend to electrically inductive or conductive conditions, wherein said powders have a resistivity of from about $10^9$ to about $10^{13}$ ohm. meters at about 20 percent relative humidity.

3. A process for imparting an electrostatic charge to organic powders to render them useful for powder coating applications, which comprises forming a blend of said powders and a polyethoxylated stearyl alcohol as an electrostatically active modifying agent to improve the charge on said powders, and subjecting said blend to electrically inductive or conductive conditions wherein said powders have a resistivity of from about $10^9$ to about $10^{13}$ ohm. meters at about 20 percent relative humidity.

* * * * *